US012767163B2

(12) United States Patent
Fan et al.

(10) Patent No.: US 12,767,163 B2
(45) Date of Patent: Oct. 20, 2026

(54) DRIVING ASSISTANCE DEVICE, DRIVING ASSISTANCE METHOD, AND NON-TRANSITORY RECORDING MEDIUM

(71) Applicant: TOYOTA JIDOSHA KABUSHIKI KAISHA, Toyota (JP)

(72) Inventors: Yizhou Fan, Suginami-ku Tokyo-to (JP); Tsubasa Imoto, Koto-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 19/021,397

(22) Filed: Jan. 15, 2025

(65) Prior Publication Data

US 2025/0236309 A1 Jul. 24, 2025

(30) Foreign Application Priority Data

Jan. 22, 2024 (JP) ................................ 2024-007536

(51) Int. Cl.
*B60W 50/14* (2020.01)
*B60W 30/165* (2020.01)
*B60W 30/18* (2012.01)
*G06V 20/58* (2022.01)

(52) U.S. Cl.
CPC .......... *B60W 50/14* (2013.01); *B60W 30/165* (2013.01); *B60W 30/18163* (2013.01); *G06V 20/58* (2022.01); *B60W 2050/143* (2013.01); *B60W 2050/146* (2013.01); *B60W 2420/403* (2013.01)

(58) Field of Classification Search
CPC ............... B60W 50/14; B60W 30/165; B60W 30/18163; B60W 2050/143; B60W 2050/146; B60W 2420/403; B60W 50/10; B60W 2554/80; B60W 30/12; G06V 20/58
See application file for complete search history.

(56) References Cited

U.S. PATENT DOCUMENTS

| | | | | |
|---|---|---|---|---|
| 2005/0125125 | A1* | 6/2005 | Matsumoto ............ | G08G 1/167 701/41 |
| 2007/0115105 | A1* | 5/2007 | Schmitz ............... | B60K 31/047 340/576 |
| 2018/0273033 | A1* | 9/2018 | Johnson ................ | B60W 30/12 |
| 2023/0211824 | A1 | 7/2023 | Sakaguchi et al. | |

FOREIGN PATENT DOCUMENTS

| | | | |
|---|---|---|---|
| JP | 2015-102891 | A | 6/2015 |
| JP | 2017-114258 | A | 6/2017 |
| JP | 2022-024562 | A | 2/2022 |

* cited by examiner

*Primary Examiner* — Omeed Alizada
(74) *Attorney, Agent, or Firm* — Dinsmore & Shohl LLP

(57) ABSTRACT

A driving assistance device acquires result of detection of a surrounding situation sensor detecting a surrounding situation of a host vehicle, determines whether a lane departure of the host vehicle is an intentional lane departure by a driver of the host vehicle based on the result of detection, and determines that the lane departure of the host vehicle is the intentional lane departure by the driver of the host vehicle when the result of detection showing that the host vehicle is departing from a lane by following a preceding vehicle which is departing from the lane is acquired.

10 Claims, 8 Drawing Sheets

DRIVING ASSISTANCE DEVICE, DRIVING ASSISTANCE METHOD, AND NON-TRANSITORY RECORDING MEDIUM

CROSS-REFERENCE TO RELATED APPLICATIONS

This application claims priority to Japanese Patent Application No. 2024-007536 filed Jan. 22, 2024, the entire contents of which are herein incorporated by reference.

FIELD

The present disclosure relates to driving assistance device, driving assistance method, and non-transitory recording medium.

BACKGROUND

PTL 1 (Japanese Unexamined Patent Publication No. 2015-102891) describes the art of providing an alert by a content corresponding to an operating state when a vehicle is departing from a lane. In the art described in PTL 1, it is determined to be an intentional action of a driver when lane departure direction and blinker direction are the same, a gaze direction of the driver is detected, a threshold value of an amount of lane departure is adjusted so as to make it easier to issue the alert when it is determined from the gaze direction of the driver that the attention paid to driving is lax, it is determined whether the driver recognizes an obstacle based on the gaze direction of the driver, and the level of the alert to the lane departure of the vehicle is determined in accordance with result of determination of a determination unit.

In this regard, PTL 1 does not describe the lane departure of a host vehicle following the lane departure of a preceding vehicle. In the art described in PTL 1, suitable control is not performed when the lane departure of the host vehicle follows the lane departure of the preceding vehicle. For this reason, in the art described in PTL 1, when the preceding vehicle and the host vehicle cannot continue to travel in the same lane in which they are traveling due to, for example, construction, accident, disabled vehicle, etc. and when the preceding vehicle and the host vehicle change lanes avoiding, for example, the construction, the accident, the disabled vehicle, etc. without activating the blinker, it is liable to end up being determined that the action is not an intentional action of the driver of the host vehicle.

SUMMARY

Considering the above-mentioned point, the present disclosure has as its object to provide driving assistance device, driving assistance method, and non-transitory recording medium able to suitably determine whether a lane departure of a host vehicle is an intentional lane departure by a driver of the host vehicle.

(1) One aspect of the present disclosure is a driving assistance device including a processor configured to: acquire result of detection of a surrounding situation sensor detecting a surrounding situation of a host vehicle; determine whether a lane departure of the host vehicle is an intentional lane departure by a driver of the host vehicle based on the result of detection; and determine that the lane departure of the host vehicle is the intentional lane departure by the driver of the host vehicle when the result of detection showing that the host vehicle is departing from a lane by following a preceding vehicle which is departing from the lane is acquired.

(2) In the driving assistance device of the aspect (1), the processor may determine that the lane departure of the host vehicle is the intentional lane departure by the driver of the host vehicle when the result of detection showing the lane departure of the host vehicle and information showing that an HMI receives an operation to flash a hazard lamp to are acquired.

(3) In the driving assistance device of the aspect (1) or (2), wherein the processor may determine that the lane departure of the host vehicle is the intentional lane departure by the driver of the host vehicle when the HMI receives the operation to flash the hazard lamp before the lane departure of the host vehicle.

(4) In the driving assistance device of any of the aspects (1) to (3), wherein the processor may determine that the lane departure of the host vehicle is the intentional lane departure by the driver of the host vehicle when the surrounding situation sensor detects traveling of an emergency vehicle and the HMI receives the operation to flash the hazard lamp before the lane departure of the host vehicle.

(5) In the driving assistance device of any of the aspects (1) to (4), wherein the processor may determine that the lane departure of the host vehicle is the intentional lane departure by the driver of the host vehicle when the host vehicle receives emergency information and the HMI receives the operation to flash the hazard lamp before the lane departure of the host vehicle.

(6) In the driving assistance device of any of the aspects (1) to (5), the processor may provide driving assistance for the host vehicle changing lanes when it is determined that the lane departure of the host vehicle is the intentional lane departure by the driver of the host vehicle.

(7) In the driving assistance device of any of the aspects (1) to (6), the processor may perform control to turn on a blinker automatically without the need for the operation by the driver of the host vehicle.

(8) In the driving assistance device of any of the aspects (1) to (7), the processor may perform control for making the HMI output an alert showing the lane departure of the host vehicle.

(9) In the driving assistance device of any of the aspects (1) to (8), the processor may perform control for making the HMI output an alert showing the lane departure of the host vehicle when it is determined that the lane departure of the host vehicle is not the intentional lane departure by the driver of the host vehicle.

(10) Another aspect of the present disclosure is a driving assistance method including: acquiring result of detection of a surrounding situation sensor detecting a surrounding situation of a host vehicle; determining whether a lane departure of the host vehicle is an intentional lane departure by a driver of the host vehicle based on the result of detection; and determining that the lane departure of the host vehicle is the intentional lane departure by the driver of the host vehicle when the result of detection showing that the host vehicle is departing from a lane by following a preceding vehicle which is departing from the lane is acquired.

(11) Another aspect of the present disclosure is a non-transitory recording medium having recorded thereon a computer program for causing a processor to perform a process including: acquiring result of detection of a surrounding situation sensor detecting a surrounding situation of a host vehicle; determining whether a lane departure of the host vehicle is an intentional lane departure by a driver of the host vehicle based on the result of detection; and determining that the lane departure of the host vehicle is the intentional lane departure by the driver of the host vehicle when the result of detection showing that the host vehicle is departing from a lane by following a preceding vehicle which is departing from the lane is acquired.

According to the present disclosure, it is possible to suitably determine whether the lane departure of the host vehicle is the intentional lane departure by the driver of the host vehicle.

DESCRIPTION OF EMBODIMENTS

Figure 1:
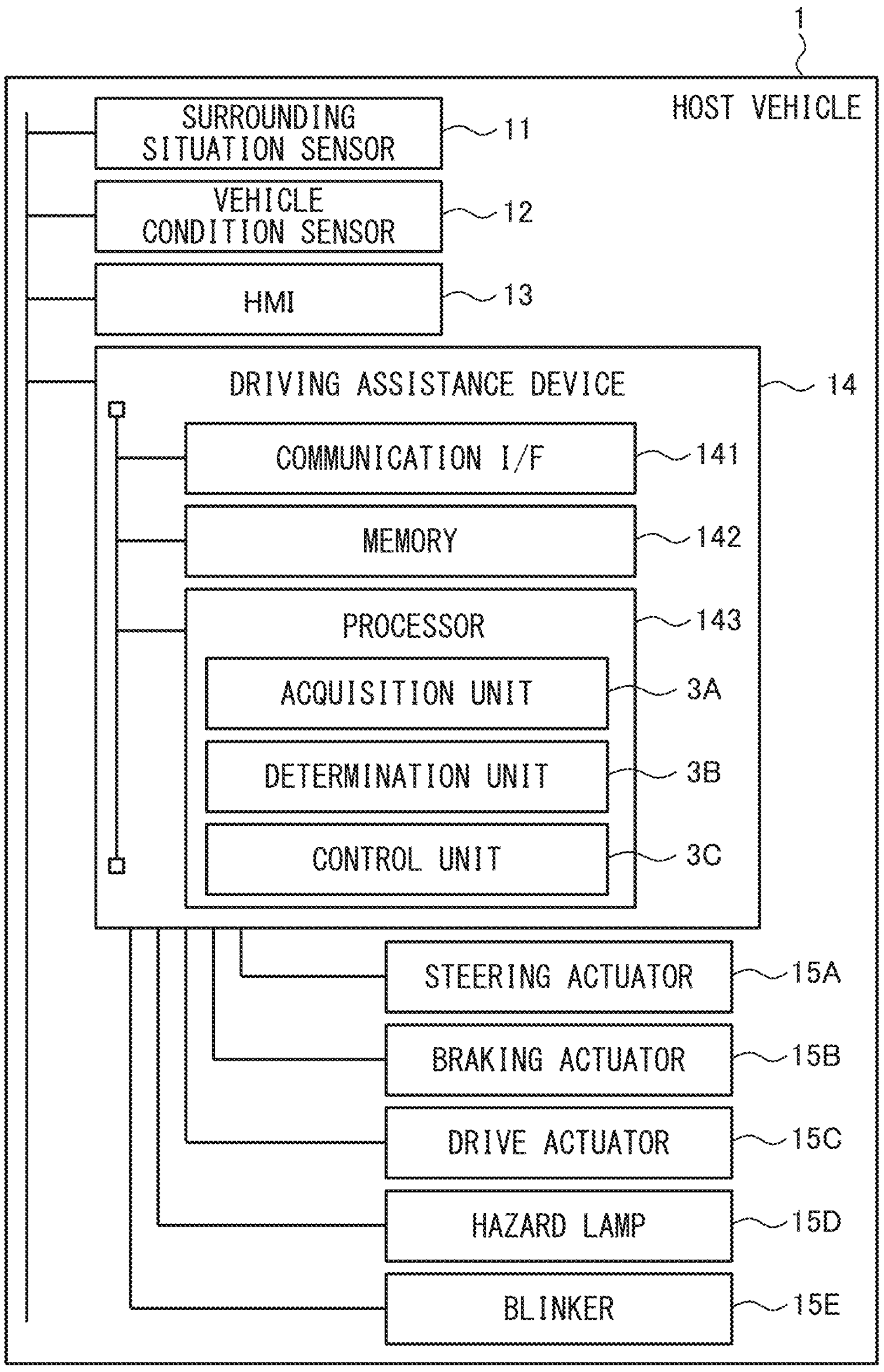
FIG. 1 is a view showing one example of a host vehicle 1 to which a driving assistance device 14 of a first embodiment is applied.

Below, referring to the drawings, embodiments of driving assistance device, driving assistance method, and non-transitory recording medium of the present disclosure will be explained.

First Embodiment

FIG. 1 is a view showing one example of a host vehicle 1 to which a driving assistance device 14 of a first embodiment is applied.

In the example shown in FIG. 1, the host vehicle 1 is provided with surrounding situation sensor 11, vehicle condition sensor 12, HMI (Human Machine Interface) 13, the driving assistance device 14, steering actuator 15A, braking actuator 15B, drive actuator 15C, hazard lamp 15D, and blinker 15E.

The surrounding situation sensor 11 detects a surrounding situation of the host vehicle 1 (for example, objects existing around the host vehicle 1 etc. (for example, compartment line defining a lane in which the host vehicle 1 is traveling, surrounding vehicle such as a preceding vehicle PV (see FIG. 2A to FIG. 2C), structure, and the like)) and sends the result of detection to the driving assistance device 14. The surrounding situation sensor 11 includes, for example, camera shooting the front of the host vehicle 1, LiDAR (Light Detection And Ranging), or the like.

The vehicle condition sensor 12 detects condition of the host vehicle 1 and sends the result of detection to the driving assistance device 14. The vehicle condition sensor 12, for example, includes a speed sensor, acceleration sensor, or the like.

The HMI 13 has the function of receiving various operations by a driver of the host vehicle 1, the function of outputting an alert by display, voice, etc. to the driver of the host vehicle 1, etc. and sends signals showing the operations by the driver of the host vehicle 1 to the driving assistance device 14 (sends information showing that the operations by the driver of the host vehicle 1 are received to the driving assistance device 14).

The driving control device 14 is configured by for example a driving assistance ECU (electronic control unit) etc. The driving assistance device 14 is configured by a microcomputer provided with communication interface (I/F) 141, memory 142, and processor 143. The communication interface 141 has an interface circuit for connecting the driving assistance device 14 to the surrounding situation sensor 11, the vehicle condition sensor 12, the HMI 13, the steering actuator 15A, the braking actuator 15B, the drive actuator 15C, the hazard lamp 15D, and the blinker 15E. The memory 142 stores a program used in a process performed by the processor 143 and various data. The processor 143 has the function as an acquisition unit 3A, the function as a determination unit 3B, and the function as a control unit 3C.

The acquisition unit 3A acquires the result of detection of the surrounding situation sensor 11. The acquisition unit 3A acquires the result of detection of the surrounding situation sensor 11 showing, for example, lane departure of the host vehicle 1 and the like.

In more detail, the acquisition unit 3A has the function of, for example, estimating whether the host vehicle 1 is departing from the lane in which the host vehicle 1 is traveling based on the result of detection of the surrounding situation sensor 11 (sensor data of the surrounding situation sensor 11) by using a model obtained by learning using teacher data which is a dataset with the result of detection of the surrounding situation sensor mounted in a learning vehicle (the sensor data of the surrounding situation sensor mounted in the learning vehicle) and a label showing whether the learning vehicle is departing from the lane in which the learning vehicle is traveling and acquiring the information showing whether the host vehicle 1 is departing from the lane in which the host vehicle 1 is traveling.

Further, the acquisition unit 3A has the function of, for example, estimating traveling trace of the host vehicle 1 based on the result of detection of the surrounding situation sensor 11 showing the compartment line defining a lane in which the host vehicle 1 is traveling and the like (time-series sensor data of the surrounding situation sensor 11) and acquiring the information showing the traveling trace of the host vehicle 1.

Furthermore, the acquisition unit 3A has the function of estimating the traveling trace of the preceding vehicle PV (see FIG. 2A to FIG. 2C) based on the result of detection of the surrounding situation sensor 11 (the time-series sensor data of the surrounding situation sensor 11) and acquiring the information showing the traveling trace of the preceding vehicle PV. In more detail, the acquisition unit 3A has the function of estimating whether the preceding vehicle PV is departing from the lane in which the preceding vehicle PV is traveling based on the result of detection of the surrounding situation sensor 11 (the sensor data of the surrounding situation sensor 11) and acquiring the information showing whether the preceding vehicle PV is departing from the lane in which the preceding vehicle PV is traveling.

That is, the acquisition unit 3A has the function of estimating whether the host vehicle 1 is departing from the lane by following the preceding vehicle PV which is departing from the lane based on the information showing the traveling trace of the host vehicle 1, the information showing whether the host vehicle 1 is departing from the lane in which the host vehicle 1 is traveling, the information showing the traveling trace of the preceding vehicle PV, and the information showing whether the preceding vehicle PV is departing from the lane in which the preceding vehicle PV is traveling and acquiring the information showing whether the host vehicle 1 is departing from the lane by following the preceding vehicle PV which is departing from the lane.

Further, the acquisition unit 3A acquires the result of detection of the vehicle condition sensor 12, the signals showing the operations by the driver of the host vehicle 1 received by the HMI 13 receives, and the like.

The determination unit 3B determines whether the lane departure of the host vehicle 1 is an intentional lane departure by the driver of the host vehicle 1 based on the result of detection of the surrounding situation sensor 11 acquired by the acquisition unit 3A.

The determination unit 3B determines that the lane departure of the host vehicle 1 is the intentional lane departure by the driver of the host vehicle 1 when the result of detection of the surrounding situation sensor 11 showing that the host vehicle 1 is departing from the lane by following the preceding vehicle PV which is departing the lane is acquired by the acquisition unit 3A.

The determination unit 3B determines that the lane departure of the host vehicle 1 is not the intentional lane departure by the driver of the host vehicle 1 when the acquisition unit 3A does not acquire the result of detection of the surrounding situation sensor 11 showing that the host vehicle 1 is departing from the lane by following the preceding vehicle PV which is departing the lane (that is, when the acquisition unit 3A acquires the result of detection of the surrounding situation sensor 11 showing that the host vehicle 1 is departing from the lane without following the preceding vehicle PV which is departing from the lane).

The control unit 3C controls the steering actuator 15A, the braking actuator 15B, the drive actuator 15C, the hazard lamp 15D, and the blinker 15E based on, for example, the information (data, signals) sent from the surrounding situation sensor 11, the vehicle condition sensor 12, and the HMI 13.

The control unit 3C performs control for making the HMI 13 output the alert (LDA: lane departure alert) showing that the host vehicle 1 is departing from the lane when the acquisition unit 3A acquires the information showing that the host vehicle 1 is departing from the lane in which the host vehicle 1 is traveling.

In more detail, the control unit 3C performs the control for making the HMI 13 output the alert showing that the host vehicle 1 is departing from the lane when the acquisition unit 3A acquires the information showing that the host vehicle 1 is departing from the lane in which the host vehicle 1 is traveling and when the determination unit 3B determines that the lane departure of the host vehicle 1 is not the intentional lane departure by the driver of the host vehicle 1 (for example, when the lane departure of the host vehicle 1 is due to the driver of the host vehicle 1 driving distracted, dozing driving, etc.)

Figure 2A:
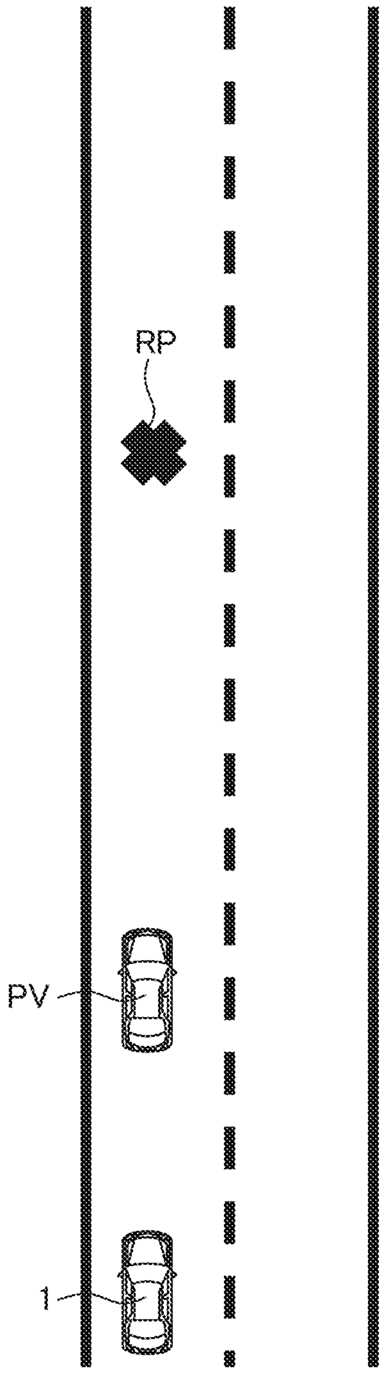
FIG. 2A shows a state where the host vehicle 1 is traveling in the same lane as a preceding vehicle PV by following the preceding vehicle PV.
Figure 2B:
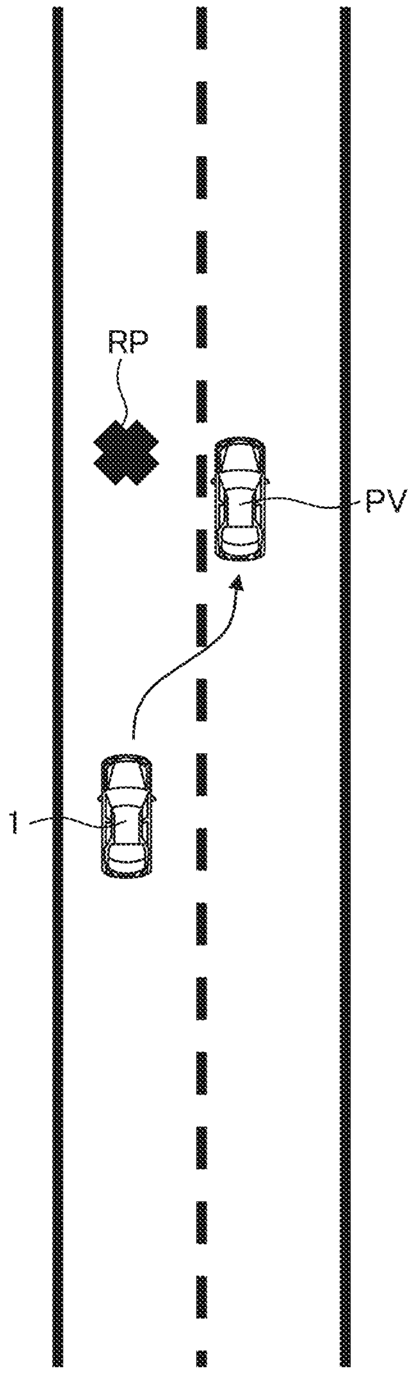
FIG. 2B shows the state after the preceding vehicle PV departs from the lane in which the preceding vehicle PV is traveling to avoid a traffic regulation area RP caused by, for example, construction, accident, disabled vehicle, etc. (after the preceding vehicle PV changes lanes) and before the host vehicle 1 departs from the lane in which the host vehicle 1 is traveling to avoid the traffic regulation area RP (before the host vehicle 1 changes the lanes).
Figure 2C:
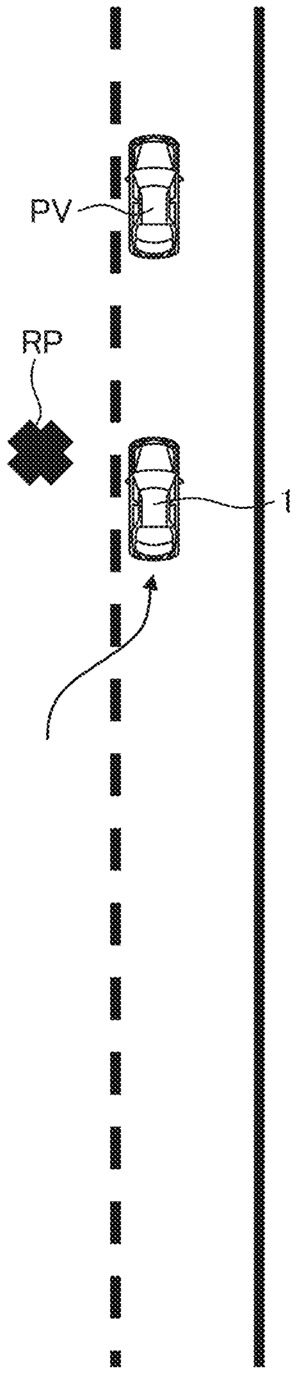
FIG. 2C shows the state after the host vehicle 1 departs from the lane in which the host vehicle 1 is traveling (after the host vehicle 1 changes the lane) by following the preceding vehicle PV which is departing from the lane (changes the lane) to avoid the traffic regulation area RP.

On the other hand, the control unit 3C does not make the HMI 13 output the alert showing that the host vehicle 1 is departing from the lane when the acquisition unit 3A acquires the information showing that the host vehicle 1 is departing from the lane in which the host vehicle 1 is traveling and when the determination unit 3B determines that the lane departure of the host vehicle 1 is the intentional lane departure by the driver of the host vehicle 1 for example like in the example shown in FIG. 2A to FIG. 2C explained later. For this reason, it is possible to keep down the liability of the driver of the host vehicle 1 ending up feeling bothered by the alert.

In other words, in the example shown in FIG. 1, the control unit 3C performs the control to limit the alert which is output as driving assistance at the time of lane change of the host vehicle 1 when the host vehicle 1 is departing from the lane, when the acquisition unit 3A acquires the information showing that the host vehicle 1 is departing from the lane in which the host vehicle 1 is traveling and when the determination unit 3B determines that the lane departure of the host vehicle 1 is the intentional lane departure by the driver of the host vehicle 1 for example like in the example shown in FIG. 2A to FIG. 2C.

In another example, the control unit 3C may perform the control to turn on the blinker 15E automatically without the need for the operation by the driver of the host vehicle 1 as the driving assistance at the time of the lane change of the host vehicle 1, when the acquisition unit 3A acquires the information showing that the host vehicle 1 is departing from the lane in which the host vehicle 1 is traveling and when the determination unit 3B determines that the lane departure of the host vehicle 1 is the intentional lane departure by the driver of the host vehicle 1 for example like in the example shown in FIG. 2A to FIG. 2C.

In still another example, the control unit 3C may perform the control (steering assistance) to operate the steering actuator 15A without the need for input operation by the driver of the host vehicle 1 as the driving assistance at the time of the lane change of the host vehicle 1, when the acquisition unit 3A acquires the information showing that the host vehicle 1 is departing from the lane in which the host vehicle 1 is traveling and when the determination unit 3B determines that the lane departure of the host vehicle 1 is not the intentional lane departure by the driver of the host vehicle 1 (for example, when the lane departure of the host vehicle 1 is due to the driver of the host vehicle 1 driving distracted, dozing driving, etc.)

In this example, the control unit 3C does not perform the control (steering assistance) to operate the steering actuator 15A without the need for the input operation by the driver of the host vehicle 1, when the acquisition unit 3A acquires the information showing that the host vehicle 1 is departing from the lane in which the host vehicle 1 is traveling and when the determination unit 3B determines that the lane departure of the host vehicle 1 is the intentional lane departure by the driver of the host vehicle 1 for example like in the example shown in FIG. 2A to FIG. 2C. For this reason, it is possible to keep down the liability of the driver of the host vehicle 1 ending up feeling bothered by the steering assistance provided against the intent of the driver of the host vehicle 1.

FIG. 2A to FIG. 2C are views for explaining one example in which the determination unit 3B of the driving assistance device 14 of the first embodiment determines that the lane departure of the host vehicle 1 is the intentional lane departure by the driver of the host vehicle 1. In more detail, FIG. 2A shows a state where the host vehicle 1 is traveling in the same lane as the preceding vehicle PV by following the preceding vehicle PV. FIG. 2B shows the state after the preceding vehicle PV departs from the lane in which the preceding vehicle PV is traveling to avoid a traffic regulation area RP caused by, for example, construction, accident, disabled vehicle, etc. (after the preceding vehicle PV changes lanes) and before the host vehicle 1 departs from the lane in which the host vehicle 1 is traveling to avoid the traffic regulation area RP (before the host vehicle 1 changes the lanes). FIG. 2C shows the state after the host vehicle 1 departs from the lane in which the host vehicle 1 is traveling (after the host vehicle 1 changes the lane) by following the preceding vehicle PV which is departing from the lane (changes the lane) to avoid the traffic regulation area RP.

In the example shown in FIG. 2A to FIG. 2C, as shown in FIG. 2A, the host vehicle 1 is traveling in the same lane as the preceding vehicle PV by following the preceding vehicle PV. The traffic regulation area RP caused by, for example, construction, accident, disabled vehicle, etc. exists ahead (upper side of FIG. 2A to FIG. 2C) of the lane in which the preceding vehicle PV and host vehicle 1 are traveling. For this reason, the preceding vehicle PV cannot continue traveling in the lane in which the preceding vehicle PV is traveling. The preceding vehicle PV changes the lane without activating the blinker as shown in FIG. 2B in accordance with, for example, guidance by a guide (not shown) etc. (that is, the preceding vehicle PV departs from the lane). Since the host vehicle 1 traveling by following the preceding vehicle PV also cannot continue traveling in the lane in which the host vehicle 1 is traveling, the host vehicle 1 changes the lane without activating the blinker as shown in FIG. 2C, in the same way as the preceding vehicle PV (that is, the host vehicle 1 departs from the lane). At that time, if the alert (LDA) showing that the host vehicle 1 is departing from the lane is output by the HMI 13, the driver of the host vehicle 1 is liable to end up feeling bothered by the alert.

Therefore, in the example shown in FIG. 2A to FIG. 2C, although the acquisition unit 3A acquires the information showing that the host vehicle 1 is departing from the lane in which the host vehicle 1 is traveling (the result of detection of the surrounding situation sensor 11), since the acquisition unit 3A also acquires the information showing that the host vehicle 1 is departing from the lane by following the preceding vehicle PV which is departing from the lane (the result of detection of the surrounding situation sensor 11), the determination unit 3B determines that the lane departure of the host vehicle 1 is the intentional lane departure by the driver of the host vehicle 1. As a result, the control unit 3C does not make the HMI 13 output the alert showing that the host vehicle 1 is departing from the lane. For this reason, it is possible to keep the driver of the host vehicle 1 from being liable to end up feeling bothered by the alert.

Figure 3:
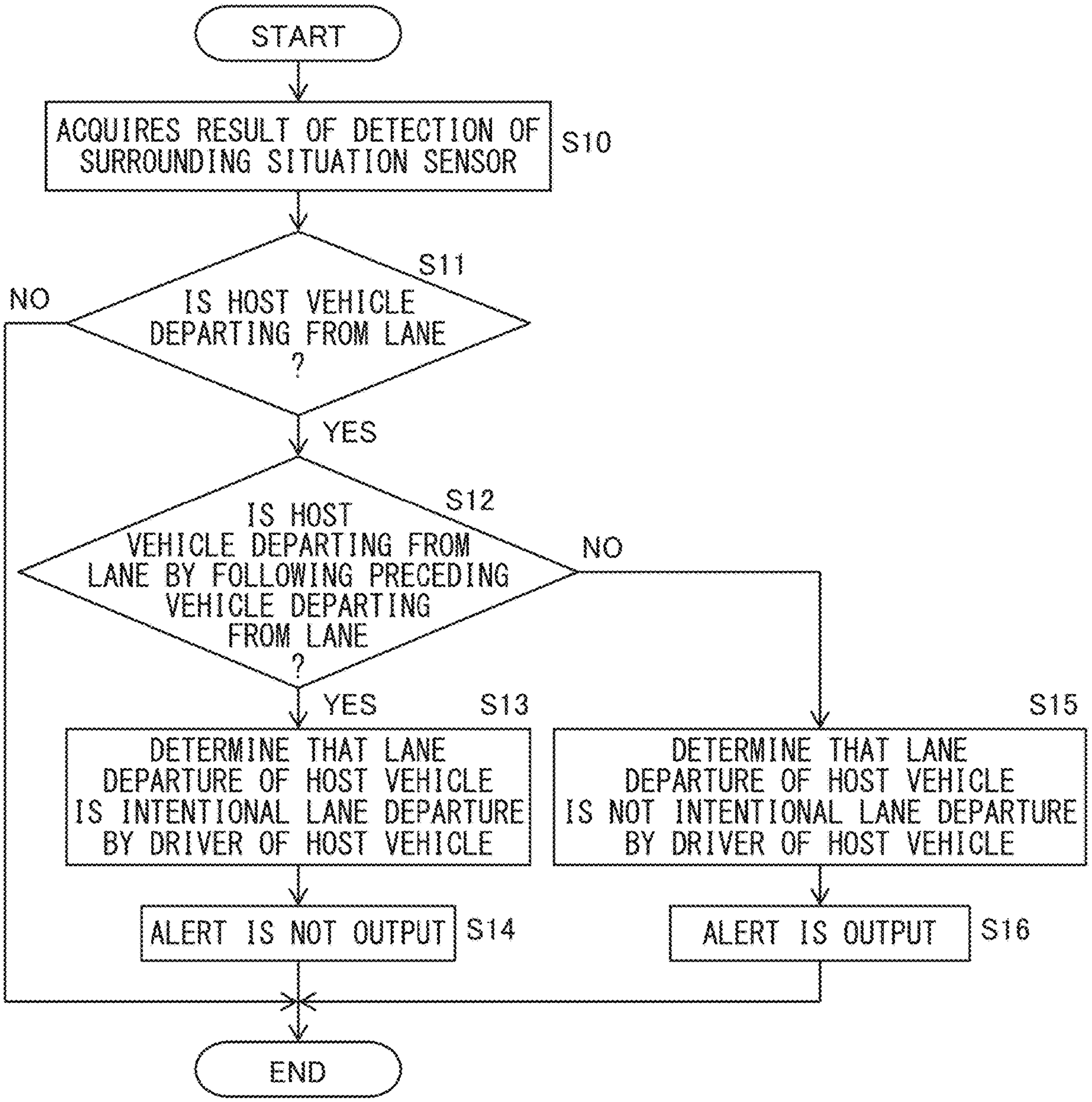
FIG. 3 is a flowchart for explaining one example of a process performed by a processor 143 of the driving assistance device 14 of the first embodiment.

FIG. 3 is a flowchart for explaining one example of the process performed by the processor 143 of the driving assistance device 14 of the first embodiment.

In the example shown in FIG. 3, at step S10, the acquisition unit 3A acquires the result of detection of the surrounding situation sensor 11.

At step S11, the acquisition unit 3A estimates whether the host vehicle is departing from the lane in which the host vehicle 1 is traveling based on the result of detection of the surrounding situation sensor 11 acquired at step S10. When the acquisition unit 3A estimates that the host vehicle 1 is departing from the lane in which the host vehicle 1 is traveling, the routine proceeds to step S12, while when the acquisition unit 3A estimates that the host vehicle 1 is not departing from the lane in which the host vehicle 1 is traveling, the process shown in FIG. 3 is ended.

At step S12, the acquisition unit 3A estimates whether the host vehicle 1 is departing from the lane by following the preceding vehicle PV which is departing from the lane based on the information showing the traveling trace of the host vehicle 1, the information showing whether the host vehicle 1 is departing from the lane in which the host vehicle 1 is traveling, the information showing the traveling trace of the preceding vehicle PV, and the information showing whether the preceding vehicle PV is departing from the lane in which the preceding vehicle PV is traveling. When the acquisition unit 3A estimates that the host vehicle 1 is departing from the lane by following the preceding vehicle PV which is departing from the lane, the routine proceeds to step S13, while when the acquisition unit 3A estimates that the host vehicle 1 is departing from the lane without following the preceding vehicle PV which is departing from the lane, the routine proceeds to step S15.

At step S13, the determination unit 3B determines that the lane departure of the host vehicle 1 is the intentional lane departure by the driver of the host vehicle 1.

At step S14, the control unit 3C does not make the HMI 13 output the alert showing that the host vehicle 1 is departing from the lane.

At step S15, the determination unit 3B determines that the lane departure of the host vehicle 1 is not the intentional lane departure by the driver of the host vehicle 1.

At step S16, the control unit 3C makes the HMI 13 output the alert showing that the host vehicle 1 is departing from the lane.

Second Embodiment

The host vehicle 1 to which the driving assistance device 14 of a second embodiment is applied is configured in the same way as the host vehicle 1 to which the driving assistance device 14 of the above-mentioned first embodiment is applied except for the points mentioned later.

In an example of the host vehicle 1 to which the driving assistance device 14 of the second embodiment is applied, when the HMI 13 receives the operation of the driver of the host vehicle 1 to flash the hazard lamp 15D, the acquisition unit 3A acquires the information showing that the HMI 13 receives the operation to flash the hazard lamp 15D.

When the acquisition unit 3A acquires the result of detection of the surrounding situation sensor 11 showing that the host vehicle 1 is departing from the lane and the information showing that the HMI 13 receives the operation to flash the hazard lamp 15D, the determination unit 3B determines that the lane departure of the host vehicle 1 is the intentional lane departure by the driver of the host vehicle 1 and the control unit 3C does not make the HMI 13 output the alert showing the host vehicle 1 is departing from the lane.

In more detail, in the example of the host vehicle 1 to which the driving assistance device 14 of the second embodiment is applied, when the HMI 13 receives the operation to flash the hazard lamp 15D (in more detail, when the acquisition unit 3A acquires the information showing that the HMI 13 receives the operation to flash the hazard lamp 15D) before the host vehicle 1 departs from the lane in which the host vehicle 1 is traveling (in more detail, before the acquisition unit 3A estimates that the host vehicle 1 is departing from the lane in which the host vehicle 1 is traveling), the determination unit 3B determines that the lane departure of the host vehicle 1 is the intentional lane departure by the driver of the host vehicle 1 and the control unit 3C does not make the HMI 13 output the alert showing the host vehicle 1 is departing from the lane.

Figures 4A, 4B, 4C:
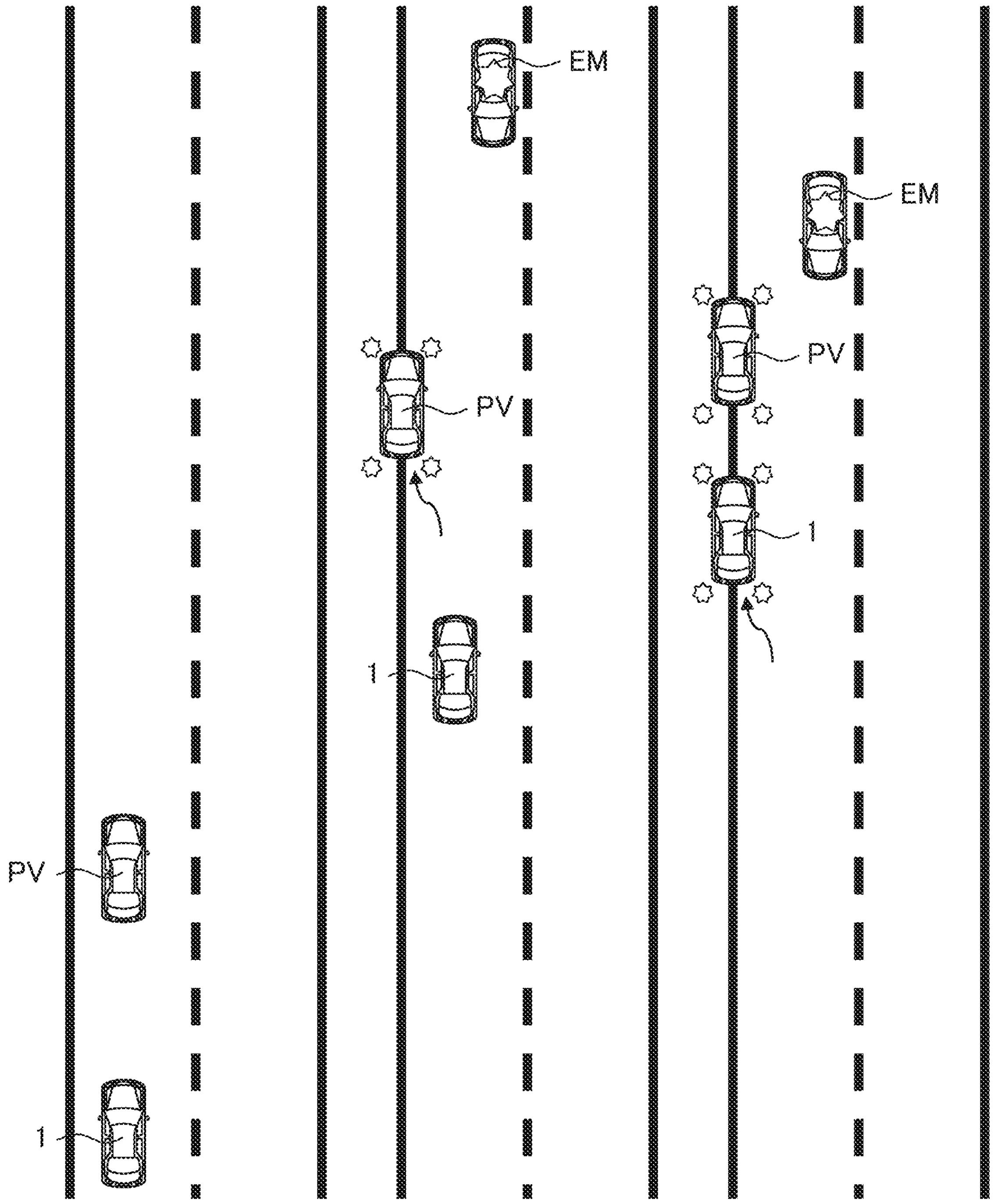
FIG. 4A shows the state where the host vehicle 1 is traveling in the same lane as the preceding vehicle PV by following the preceding vehicle PV.
FIG. 4B shows the state after the preceding vehicle PV departs from the lane in which the preceding vehicle PV is traveling to give way to an emergency vehicle EM traveling in the opposite direction in the lane in which the host vehicle 1 and preceding vehicle PV are traveling and where a driver of the host vehicle 1 is not yet aware of the traveling of the emergency vehicle EM.
FIG. 4C shows the state where the driver of the host vehicle 1 is aware of the traveling of the emergency vehicle EM, the driver of the host vehicle 1 performs an operation to flash a hazard lamp so as to give way to the emergency vehicle EM and the host vehicle 1 is departing from the lane in which the host vehicle 1 is traveling.

FIG. 4A to FIG. 4C are views for explaining one example in which the determination unit 3B of the driving assistance device 14 of the second embodiment determines that the lane departure of the host vehicle 1 is the intentional lane departure by the driver of the host vehicle 1. In more detail, FIG. 4A shows the state where the host vehicle 1 is traveling in the same lane as the preceding vehicle PV by following the preceding vehicle PV. FIG. 4B shows the state after the preceding vehicle PV departs from the lane in which the preceding vehicle PV is traveling to give way to an emergency vehicle EM traveling in the opposite direction in the lane in which the host vehicle 1 and preceding vehicle PV are traveling and where the driver of the host vehicle 1 is not yet aware of the traveling of the emergency vehicle EM. FIG. 4C shows the state where the driver of the host vehicle 1 is aware of the traveling of the emergency vehicle EM, the driver of the host vehicle 1 performs an operation to flash a hazard lamp so as to give way to the emergency vehicle EM and the host vehicle 1 is departing from the lane in which the host vehicle 1 is traveling.

In the example shown in FIG. 4A to FIG. 4C, as shown in FIG. 4A, the host vehicle 1 is traveling in the same lane as the preceding vehicle PV by following the preceding vehicle PV. Next, as shown in FIG. 4B, since the emergency vehicle EM travels in the opposite direction in the lane in which the host vehicle 1 and the preceding vehicle PV are traveling, the driver of the preceding vehicle PV noticing the traveling of the emergency vehicle EM operates to flash the hazard lamp so as to give way to the emergency vehicle EM and the preceding vehicle PV departs from the lane in which the preceding vehicle PV is traveling. On the other hand, in the state shown in FIG. 4B, the driver of the host vehicle 1 is not yet aware of the traveling of the emergency vehicle EM. Next, as shown in FIG. 4C, the driver of the host vehicle 1 noticing the traveling of the emergency vehicle EM operates to flash the hazard lamp 15D so as to give way to the emergency vehicle EM and the host vehicle 1 departs from the lane in which the host vehicle 1 is traveling. At that time, if the HMI 13 outputs the alert showing the host vehicle 1 is departing from the lane, the driver of the host vehicle 1 is liable to end up feeling bothered by the alert.

Therefore, in the example shown in FIG. 4A to FIG. 4C, when the HMI 13 receives the operation to flash the hazard lamp 15D before the host vehicle 1 departs from the lane in which the host vehicle 1 is traveling, the determination unit 3B determines that the lane departure of the host vehicle 1 is the intentional lane departure by the driver of the host vehicle 1 and the control unit 3C does not make the HMI 13 output the alert showing the host vehicle 1 is departing from the lane. As a result, it is possible to keep the driver of the host vehicle 1 from being liable to end up feeling bothered by the alert.

In the example shown in FIG. 4A to FIG. 4C, the alert showing that the host vehicle 1 is departing from the lane is not output when the host vehicle 1 is departing from the lane in which the host vehicle 1 is traveling while making the hazard lamp 15D flash so as to give way to the emergency vehicle EM, but in another example, the alert showing that the host vehicle 1 is departing from the lane may not be output when the host vehicle 1 is departing from the lane in which the host vehicle 1 is traveling while making the hazard lamp 15D flash so as to park the host vehicle 1 on the road or make it stop on the road so as not to obstruct the traveling of a following vehicle.

In still another example, the alert showing that the host vehicle 1 is departing from the lane may not be output when the host vehicle 1 is departing from the lane in which the host vehicle 1 is traveling while making the hazard lamp 15D flash so as to make a host vehicle 1 malfunctioning on a highway etc. stop at the roadside so as not to obstruct the traveling of the following vehicle.

In still another example, the alert showing that the host vehicle 1 is departing from the lane may not be output when the host vehicle 1 is departing from the lane in which the host vehicle 1 is traveling while making the hazard lamp 15D flash in order that the driver of the host vehicle 1 noticing the occurrence of an emergency situation ahead in the lane in which the host vehicle 1 is traveling makes the host vehicle 1 stop at the roadside so as not to obstruct the traveling of the emergency vehicle heading to the place where the emergency situation occurs etc.

Figure 5:
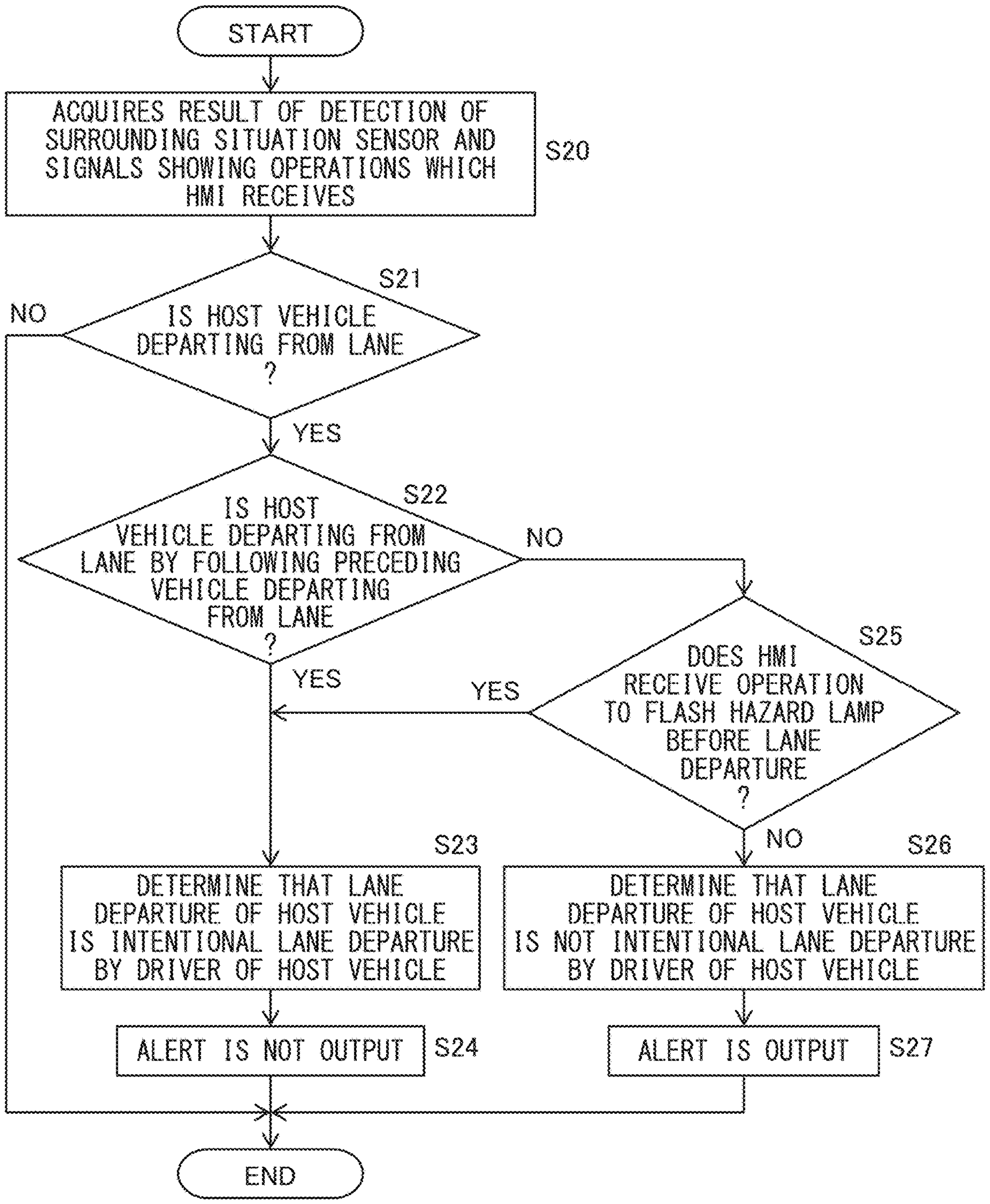
FIG. 5 is a flowchart for explaining one example of the process performed by the processor 143 of the driving assistance device 14 of a second embodiment.

FIG. 5 is a flowchart for explaining one example of the process performed by the processor 143 of the driving assistance device 14 of the second embodiment.

In the example shown in FIG. 5, at step S20, the acquisition unit 3A acquires the result of detection of the surrounding situation sensor 11 and the signals showing the operations by the driver of the host vehicle 1 which the HMI 13 receives.

At step S21, the acquisition unit 3A estimates whether the host vehicle 1 is departing from the lane in which the host vehicle 1 is traveling based on the result of detection of the surrounding situation sensor 11 acquired at step S20. When the acquisition unit 3A estimates that the host vehicle 1 is departing from the lane in which the host vehicle 1 is traveling, the routine proceeds to step S22 while when the acquisition unit 3A estimates that the host vehicle 1 is not is departing from the lane in which the host vehicle 1 is traveling, the process shown in FIG. 5 is ended.

At step S22, the acquisition unit 3A estimates whether the host vehicle 1 is departing from the lane by following the preceding vehicle PV which is departing from the lane based on the information showing the traveling trace of the host vehicle 1, the information showing whether the host vehicle 1 is departing from the lane in which the host vehicle 1 is traveling, the information showing the traveling trace of the preceding vehicle PV, and the information showing whether the preceding vehicle PV is departing from the lane in which the preceding vehicle PV is traveling. When the acquisition unit 3A estimates that the host vehicle 1 is departing from the lane by following the preceding vehicle PV which is departing from the lane, the routine proceeds to step S23, while when the acquisition unit 3A estimates that host vehicle 1 is departing from the lane without following the preceding vehicle PV which is departing from the lane, the routine proceeds to step S25.

At step S23, the determination unit 3B determines that the lane departure of the host vehicle 1 is the intentional lane departure by the driver of the host vehicle 1.

At step S24, the control unit 3C does not make the HMI 13 output the alert showing that the host vehicle 1 is departing from the lane.

At step S25, for example the determination unit 3B determines whether the HMI 13 receives the operation to flash the hazard lamp 15D (in more detail, whether the acquisition unit 3A acquires the information showing that the HMI 13 receives the operation to flash the hazard lamp 15D) before the host vehicle 1 departs from the lane in which the host vehicle 1 is traveling (in more detail, before the acquisition unit 3A estimates that the host vehicle 1 is departing from the lane in which the host vehicle 1 is traveling). When the HMI 13 receives the operation to flash the hazard lamp 15D before the host vehicle 1 departs from the lane in which the host vehicle 1 is traveling, the routine proceeds to step S23. When the HMI 13 does not receive the operation to flash the hazard lamp 15D before the host vehicle 1 departs from the lane in which the host vehicle 1 is traveling, the routine proceeds to step S26.

At step S26, the determination unit 3B determines that the lane departure of the host vehicle 1 is not the intentional lane departure by the driver of the host vehicle 1.

At step S27, the control unit 3C makes the HMI 13 output the alert showing that the host vehicle 1 is departing from the lane.

Third Embodiment

The host vehicle 1 to which the driving assistance device 14 of a third embodiment is applied is configured in the same way as the host vehicle 1 to which the driving assistance device 14 of the second embodiment is applied.

In one example of the host vehicle 1 to which the driving assistance device 14 of the third embodiment is applied, when the acquisition unit 3A acquires the result of detection of the surrounding situation sensor 11 showing that host vehicle 1 is departing from the lane, the result of detection of the surrounding situation sensor 11 showing that the emergency vehicle EM (see FIG. 4A to FIG. 4C) is traveling, and the information showing that the HMI 13 receives the operation to flash the hazard lamp 15D, the determination unit 3B determines that the lane departure of the host vehicle 1 is the intentional lane departure by the driver of the host vehicle 1 and the control unit 3C does not make the HMI 13 output the alert showing that the host vehicle 1 is departing from the lane.

The acquisition unit 3A has the function of, for example, estimating whether the traveling of the emergency vehicle is detected based on the result of detection of the surrounding situation sensor 11 (the sensor data of the surrounding situation sensor 11 (for example, camera images etc.)) (for example, estimating whether the traveling emergency vehicle EM is included in the camera images) by using the model obtained by learning using the teacher data which is the dataset with the result of detection of the surrounding situation sensor mounted in the learning vehicle (the sensor data (for example, the camera images etc.) of the surrounding situation sensor mounted in the learning vehicle) and the label showing whether the traveling of the emergency vehicle is detected by the surrounding situation sensor mounted in the learning vehicle and acquiring the information showing whether the traveling of the emergency vehicle EM is detected.

In more detail, in the example of the host vehicle 1 to which the driving assistance device 14 of the third embodiment is applied, when the surrounding situation sensor 11 detects the traveling of the emergency vehicle (in more detail, the acquisition unit 3A acquires the result of detection of the surrounding situation sensor 11 showing that the emergency vehicle EM is traveling) and the HMI 13 receives the operation to flash the hazard lamp 15D (in more detail, the acquisition unit 3A acquires the information showing that the HMI 13 receives the operation to flash the hazard lamp 15D) before the host vehicle 1 departs from the lane in which the host vehicle 1 is traveling (in more detail, before the acquisition unit 3A estimates that the host vehicle 1 is departing from the lane in which the host vehicle 1 is traveling), the determination unit 3B determines that the lane departure of the host vehicle 1 is the intentional lane departure by the driver of the host vehicle 1 and the control unit 3C does not make the HMI 13 output the alert showing that the host vehicle 1 is departing from the lane.

Figure 6:
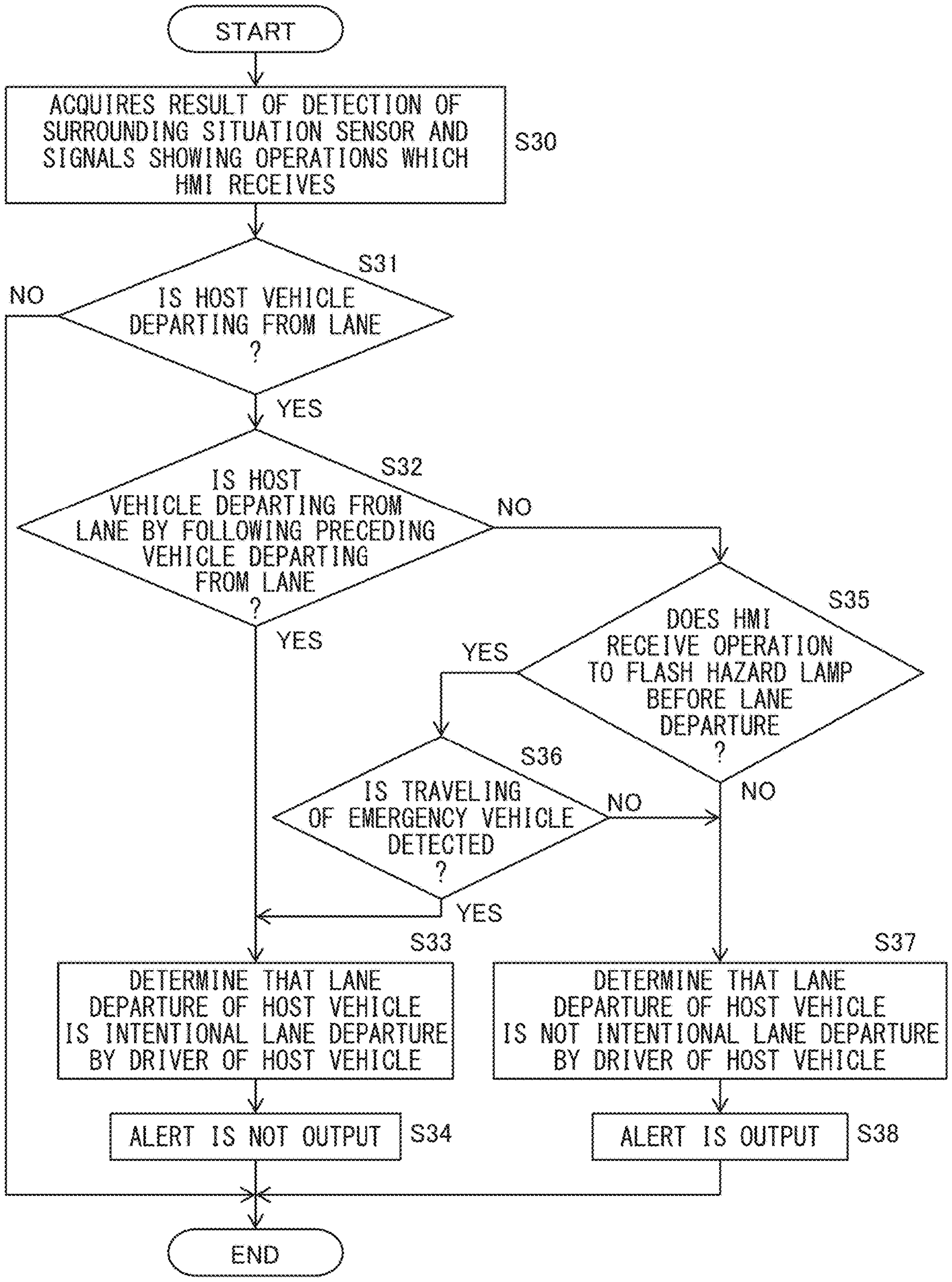
FIG. 6 is a flowchart for explaining one example of the process performed by the processor 143 of the driving assistance device 14 of a third embodiment.

FIG. 6 is a flowchart for explaining one example of the process performed by the processor 143 of the driving assistance device 14 of the third embodiment.

In the example shown in FIG. 6, at step S30, the acquisition unit 3A acquires the result of detection of the surrounding situation sensor 11 and the signals showing the operations by the driver of the host vehicle 1 which the HMI 13 receives.

At step S31, the acquisition unit 3A estimates whether the host vehicle 1 is departing from the lane in which the host vehicle 1 is traveling based on the result of detection of the surrounding situation sensor 11 acquired at step S30. When the acquisition unit 3A estimates that the host vehicle 1 is departing from the lane in which the host vehicle 1 is traveling, the routine proceeds to step S32, while when the acquisition unit 3A estimates that the host vehicle 1 is not departing from the lane in which the host vehicle 1 is traveling, the process shown in FIG. 6 is ended.

At step S32, the acquisition unit 3A estimates whether the host vehicle 1 is departing from the lane by following the preceding vehicle PV which is departing from the lane based on the information showing the traveling trace of the host vehicle 1, the information showing whether the host vehicle 1 is departing from the lane in which the host vehicle 1 is traveling, the information showing the traveling trace of the preceding vehicle PV, and the information showing whether the preceding vehicle PV is departing from the lane in which the preceding vehicle PV is traveling. When the acquisition unit 3A estimates that the host vehicle 1 is departing from the lane by following the preceding vehicle PV which is departing from the lane, the routine proceeds to step S33, while when the acquisition unit 3A estimates that the host vehicle 1 is departing from the lane without following the preceding vehicle PV which is departing from the lane, the routine proceeds to step S35.

At step S33, the determination unit 3B determines that the lane departure of the host vehicle 1 is the intentional lane departure by the driver of the host vehicle 1.

At step S34, the control unit 3C does not make the HMI 13 output the alert showing that the host vehicle 1 is departing from the lane.

At step S35, for example, the determination unit 3B determines whether the HMI 13 receives the operation to flash the hazard lamp 15D (in more detail, whether the acquisition unit 3A acquires the information showing that the HMI 13 receives the operation to flash the hazard lamp 15D) before the host vehicle 1 departs from the lane in which the host vehicle 1 is traveling (in more detail, before the acquisition unit 3A estimates that the host vehicle 1 is departing from the lane in which the host vehicle 1 is traveling). When the HMI 13 receives the operation to flash the hazard lamp 15D before the host vehicle 1 departs from the lane in which the host vehicle 1 is traveling, the routine proceeds to step S36. When the HMI 13 does not receive the operation to flash the hazard lamp 15D before the host vehicle 1 departs from the lane in which the host vehicle 1 is traveling, the routine proceeds to step S37.

At step S36, for example, the determination unit 3B determines whether the traveling of the emergency vehicle EM is detected by the surrounding sensors 11 (in more detail, determines whether the acquisition unit 3A estimates that the traveling of the emergency vehicle EM is detected based on the result of detection of the surrounding situation sensor 11) before the host vehicle 1 departs from the lane in which the host vehicle 1 is traveling. When the surrounding situation sensor 11 detects the traveling of the emergency vehicle EM before the host vehicle 1 departs from the lane in which the host vehicle 1 is traveling, the routine proceeds to step S33. When the surrounding situation sensor 11 does not detect the traveling of the emergency vehicle EM before the host vehicle 1 departs from the lane in which the host vehicle 1 is traveling, the routine proceeds to step S37.

At step S37, the determination unit 3B determines that the lane departure of the host vehicle 1 is not the intentional lane departure by the driver of the host vehicle 1.

At step S38, the control unit 3C makes the HMI 13 output the alert showing that the host vehicle 1 is departing from the lane.

Fourth Embodiment

The host vehicle 1 to which the driving assistance device 14 of a fourth embodiment is applied is configured in the same way as the host vehicle 1 to which the driving assistance device 14 of the second embodiment is applied.

Figure 7:
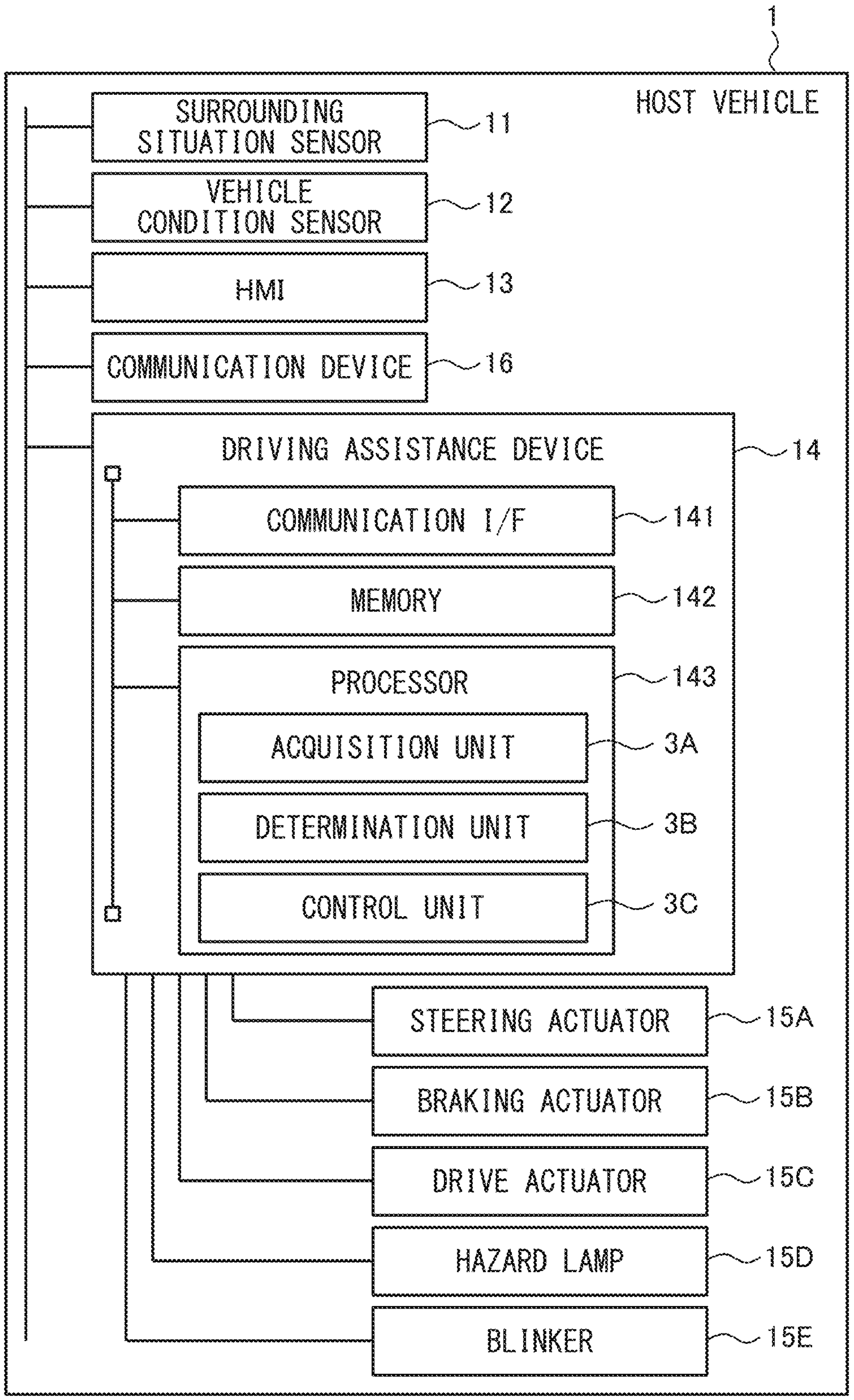
FIG. 7 is a view showing one example of the host vehicle 1 to which the driving assistance device 14 of a fourth embodiment is applied.

FIG. 7 is a view showing one example of the host vehicle 1 to which the driving assistance device 14 of the fourth embodiment is applied.

In the example shown in FIG. 7, the host vehicle 1 is, for example, provided with a communication device 16 for receiving emergency information (emergency warning) such as on earthquake emergency information (earthquake early warning), tsunami emergency information (tsunami warning), emergency information on landslides (landslide disaster emergency information), and the like.

In the example shown in FIG. 7, when the acquisition unit 3A acquires the result of detection of the surrounding situation sensor 11 showing the host vehicle 1 is departing from the lane, the result of communication of the communication device 16 showing that the emergency information is received, and the information showing the HMI 13 receives the operation to flash the hazard lamp 15D, the determination unit 3B determines that the lane departure of the host vehicle 1 is the intentional lane departure by the driver of the host vehicle 1 and the control unit 3C does not make the HMI 13 output the alert showing that the host vehicle 1 is departing from the lane.

In more detail, in the example shown in FIG. 7, when the communication device 16 receives the emergency information (in more detail, the acquisition unit 3A acquires the result of communication of the communication device 16 showing that the communication device 16 receives the emergency information) and the HMI 13 receives the operation to flash the hazard lamp 15D (in more detail, the acquisition unit 3A acquires the information showing that the HMI 13 receives the operation to flash the hazard lamp 15D) before the host vehicle 1 departs from the lane in which the host vehicle 1 is traveling (in more detail, before the acquisition unit 3A estimates that the host vehicle 1 is departing from the lane in which the host vehicle 1 is traveling), the determination unit 3B determines that the lane departure of the host vehicle 1 is the intentional lane departure by the driver of the host vehicle 1 and the control unit 3C does not make the HMI 13 output the alert showing the host vehicle 1 is departing from the lane.

Figure 8:
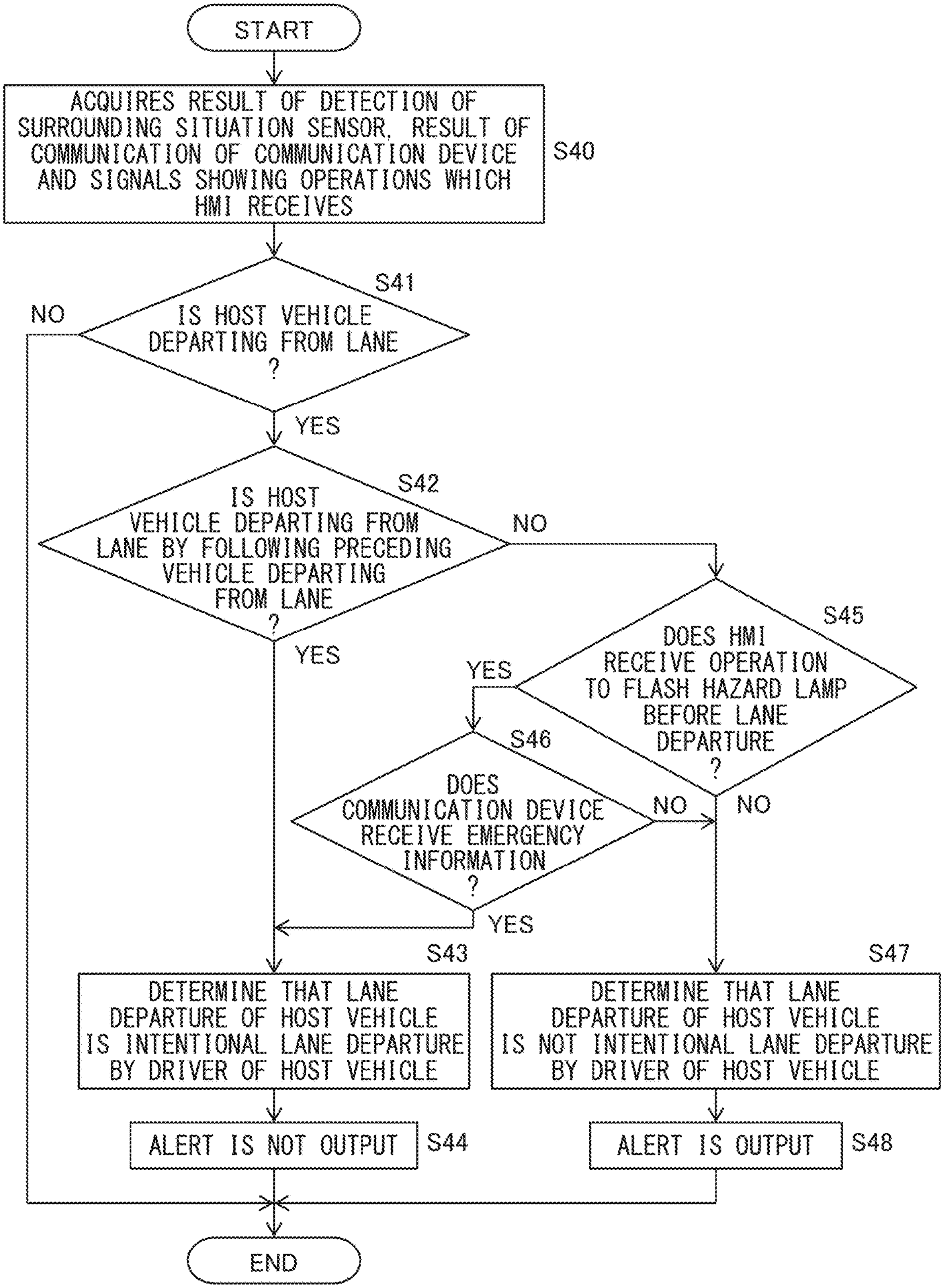
FIG. 8 is a flowchart for explaining one example of the process performed by the processor 143 of the driving assistance device 14 of the fourth embodiment.

FIG. 8 is a flowchart for explaining one example of the process performed by the processor 143 of the driving assistance device 14 of the fourth embodiment.

In the example shown in FIG. 8, at step S40, the acquisition unit 3A acquires the result of detection of the surrounding situation sensor 11, the result of communication of the communication device 16, and the signals showing the operations by the driver of the host vehicle 1 which the HMI 13 receives.

At step S41, the acquisition unit 3A estimates whether the host vehicle 1 is departing from the lane in which the host vehicle 1 is traveling based on the result of detection of the surrounding situation sensor 11 acquired at step S40. When the acquisition unit 3A estimates that the host vehicle 1 is departing from the lane in which the host vehicle 1 is traveling, the routine proceeds to step S42, while when the acquisition unit 3A estimates that the host vehicle 1 is not departing from the lane in which the host vehicle 1 is traveling, the process shown in FIG. 8 is ended.

At step S42, the acquisition unit 3A estimates whether the host vehicle 1 is departing from the lane by following the preceding vehicle PV which is departing from the lane based on the information showing the traveling trace of the host vehicle 1, the information showing whether the host vehicle 1 is departing from the lane in which the host vehicle 1 is traveling, the information showing the traveling trace of the preceding vehicle PV, and the information showing whether the preceding vehicle PV is departing from the lane in which the preceding vehicle PV is traveling. When the acquisition unit 3A estimates that the host vehicle 1 is departing from the lane by following the preceding vehicle PV which is departing from the lane, the routine proceeds to step S43, while when the acquisition unit 3A estimates that the host vehicle 1 is departing from the lane without following the preceding vehicle PV which is departing from the lane, the routine proceeds to step S45.

At step S43, the determination unit 3B determines that the lane departure of the host vehicle 1 is the intentional lane departure by the driver of the host vehicle 1.

At step S44, the control unit 3C does not make the HMI 13 output the alert showing that the host vehicle 1 is departing from the lane.

At step S45, for example, the determination unit 3B determines whether the HMI 13 receives the operation to flash the hazard lamp 15D (in more detail, whether the acquisition unit 3A acquires the information showing that the HMI 13 receives the operation to flash the hazard lamp 15D) before the host vehicle 1 departs from the lane in which the host vehicle 1 is traveling (in more detail, before the acquisition unit 3A estimates that the host vehicle 1 is departing from the lane in which the host vehicle 1 is traveling). When the HMI 13 receives the operation to flash the hazard lamp 15D before the host vehicle 1 departs from the lane in which the host vehicle 1 is traveling, the routine proceeds to step S46. When the HMI 13 does not receive the operation to flash the hazard lamp 15D before the host vehicle 1 departs from the lane in which the host vehicle 1 is traveling, the routine proceeds to step S47.

At step S46, for example, the determination unit 3B determines whether the communication device 16 receives the emergency information (in more detail, determines whether the acquisition unit 3A acquires the result of communication of the communication device 16 showing that the communication device 16 receives the emergency information) before the host vehicle 1 departs from the lane in which the host vehicle 1 is traveling. When the communication device 16 receives the emergency information before the host vehicle 1 departs from the lane in which the host vehicle 1 is traveling, the routine proceeds to step S43. When the communication device 16 does not receive the emergency information before the host vehicle 1 departs from the lane in which the host vehicle 1 is traveling, the routine proceeds to step S47.

At step S47, the determination unit 3B determines that the lane departure of the host vehicle 1 is not the intentional lane departure by the driver of the host vehicle 1.

At step S48, the control unit 3C makes the HMI 13 output the alert showing that the host vehicle 1 is departing from the lane.

As explained above, although the embodiments of the driving assistance device, the driving assistance method, and the non-transitory recording medium of the present disclosure were explained with reference to the drawings, the driving assistance device, the driving assistance method, and the non-transitory recording medium of the present disclosure are not limited to the above-mentioned embodiments and may be suitably changed without departing from the gist of the present disclosure. The constitution of each example of the embodiment explained above may be suitably combined. In each example of the embodiment explained above, the process performed in the driving assistance device 14 was explained as software process performed by executing the program, but the process performed in the driving assistance device 14 may also be the process performed by hardware. Alternatively, the process performed in the driving assistance device 14 may be the process combining both software and hardware. Further, the program (program for realizing the function of the processor 143 of the driving assistance device 14) stored in the memory 142 of the driving assistance device 14 may, for example, be recorded in a computer readable storage medium (non-transitory recording medium) such as semiconductor memory, magnetic recording medium, optical recording medium, or the like and supplied, distributed, etc.

The invention claimed is:

1. A driving assistance device comprising a processor configured to:

acquire result of detection of a surrounding situation sensor detecting a surrounding situation of a host vehicle;

determine whether a lane departure of the host vehicle is an intentional lane departure by a driver of the host vehicle based on the result of detection; and determine that the lane departure of the host vehicle is the intentional lane departure by the driver of the host vehicle when the result of detection showing that the host vehicle is departing from a lane by following a preceding vehicle which is departing from the lane is acquired, wherein the processor is configured to determine that the lane departure of the host vehicle is the intentional lane departure by the driver of the host vehicle when the result of detection showing the lane departure of the host vehicle and information showing that a human machine interface (HMI) receives an operation to flash a hazard lamp are acquired.

2. The driving assistance device according to claim 1, wherein the processor is configured to determine that the lane departure of the host vehicle is the intentional lane departure by the driver of the host vehicle when the HMI receives the operation to flash the hazard lamp before the lane departure of the host vehicle.

3. The driving assistance device according to claim 2, wherein the processor is configured to determine that the lane departure of the host vehicle is the intentional lane departure by the driver of the host vehicle when the surrounding situation sensor detects traveling of an emergency vehicle and the HMI receives the operation to flash the hazard lamp before the lane departure of the host vehicle.

4. The driving assistance device according to claim 2, wherein the processor is configured to determine that the lane departure of the host vehicle is the intentional lane departure by the driver of the host vehicle when the host vehicle receives emergency information and the HMI receives the operation to flash the hazard lamp before the lane departure of the host vehicle.

5. The driving assistance device according to claim 1, wherein the processor is configured to provide driving assistance for the host vehicle changing lanes when it is determined that the lane departure of the host vehicle is the intentional lane departure by the driver of the host vehicle.

6. The driving assistance device according to claim 5, wherein the processor is configured to perform control to turn on a blinker automatically without the need for the operation by the driver of the host vehicle.

7. The driving assistance device according to claim 5, wherein the processor is configured to perform control for making the HMI output an alert showing the lane departure of the host vehicle.

8. The driving assistance device according to claim 1, wherein the processor is configured to perform control for making the HMI output an alert showing the lane departure of the host vehicle when it is determined that the lane departure of the host vehicle is not the intentional lane departure by the driver of the host vehicle.

9. A driving assistance method comprising:

acquiring result of detection of a surrounding situation sensor detecting a surrounding situation of a host vehicle;

determining whether a lane departure of the host vehicle is an intentional lane departure by a driver of the host vehicle based on the result of detection; and determining that the lane departure of the host vehicle is the intentional lane departure by the driver of the host vehicle when the result of detection showing that the host vehicle is departing from a lane by following a preceding vehicle which is departing from the lane is acquired, wherein the lane departure of the host vehicle is determined as the intentional lane departure by the driver of the host vehicle when the result of detection showing the lane departure of the host vehicle and information showing that a human machine interface (HMI) receives an operation to flash a hazard lamp are acquired.

10. A non-transitory recording medium having recorded thereon a computer program for causing a processor to perform a process comprising:

acquiring result of detection of a surrounding situation sensor detecting a surrounding situation of a host vehicle;

determining whether a lane departure of the host vehicle is an intentional lane departure by a driver of the host vehicle based on the result of detection; and determining that the lane departure of the host vehicle is the intentional lane departure by the driver of the host vehicle when the result of detection showing that the host vehicle is departing from a lane by following a preceding vehicle which is departing from the lane is acquired, wherein the lane departure of the host vehicle is determined as the intentional lane departure by the driver of the host vehicle when the result of detection showing the lane departure of the host vehicle and information showing that a human machine interface (HMI) receives an operation to flash a hazard lamp are acquired.

* * * * *